US011598921B2

(12) United States Patent
Dai et al.

(10) Patent No.: US 11,598,921 B2
(45) Date of Patent: Mar. 7, 2023

(54) ULTRA-BROADBAND SILICON WAVEGUIDE MICRO-ELECTRO-MECHANICAL SYSTEMS (MEMS) PHOTONIC SWITCH

(71) Applicant: ZHEJIANG UNIVERSITY, Zhejiang (CN)

(72) Inventors: Daoxin Dai, Zhejiang (CN); Yi Sun, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 316 days.

(21) Appl. No.: 17/258,750

(22) PCT Filed: Feb. 24, 2020

(86) PCT No.: PCT/CN2020/076340
§ 371 (c)(1),
(2) Date: Jan. 8, 2021

(87) PCT Pub. No.: WO2021/068447
PCT Pub. Date: Apr. 15, 2021

(65) Prior Publication Data
US 2022/0269007 A1    Aug. 25, 2022

(30) Foreign Application Priority Data

Oct. 8, 2019    (CN) .......................... 201910949968.1

(51) Int. Cl.
*G02B 6/35* (2006.01)
(52) U.S. Cl.
CPC .......... *G02B 6/3546* (2013.01); *G02B 6/356* (2013.01)
(58) Field of Classification Search
None
See application file for complete search history.

(56) References Cited

U.S. PATENT DOCUMENTS

| 6,445,841 B1 * | 9/2002 | Gloeckner ........... G02B 6/3514 385/24 |
| 6,751,395 B1 * | 6/2004 | Novotny ................ G02B 6/266 385/39 |

(Continued)

FOREIGN PATENT DOCUMENTS

| CN | 2461012 | 11/2001 |
| CN | 1423755 | 6/2003 |

(Continued)

OTHER PUBLICATIONS

"International Search Report (Form PCT/ISA/210) of PCT/CN2020/076340", dated Jun. 30, 2020, pp. 1-5.

(Continued)

*Primary Examiner* — Jerry Rahll
(74) *Attorney, Agent, or Firm* — JCIP Global Inc.

(57) ABSTRACT

An ultra-broadband silicon waveguide micro-electro-mechanical systems (MEMS) photonic switch is provided, which is mainly composed of three parts: input waveguides, a waveguide crossing with a nano-gap, and output waveguides. The waveguide crossing is composed of two identical orthogonal elliptical cylinders. Four ports of the waveguide crossing respectively extend to form single-mode strip waveguides to serve as input/output waveguides. The center of the waveguide crossing is fully etched with a nano-gap. The two symmetrical port waveguides are fully etched with nano-grooves. The lower cladding near the waveguide crossing and the nano-grooves is penetrated and etched. The width of the nano-gap is adjusted through adjusting a voltage applied across both ends of the waveguide crossing, so that a guided-mode directly passes through or is totally reflected. In the disclosure, a propagation path of the photonic switch is switched through adjusting the voltage applied to the waveguide crossing.

8 Claims, 4 Drawing Sheets

(56) References Cited

U.S. PATENT DOCUMENTS

| | | | |
|---|---|---|---|
| 10,234,633 B2* | 3/2019 | Djordjevic | G02B 6/3546 |
| 2001/0024556 A1* | 9/2001 | Beguin | G02B 6/3582 |
| | | | 385/125 |
| 2001/0048784 A1* | 12/2001 | Behin | G02B 6/3556 |
| | | | 385/18 |
| 2002/0076135 A1* | 6/2002 | Myer | G02B 6/3538 |
| | | | 385/16 |
| 2003/0012483 A1* | 1/2003 | Ticknor | F04B 19/006 |
| | | | 385/39 |
| 2017/0104109 A1 | 4/2017 | Simoyama | |
| 2018/0252557 A1* | 9/2018 | Djordjevic | G02B 6/3512 |

FOREIGN PATENT DOCUMENTS

| | | |
|---|---|---|
| CN | 103293713 | 9/2013 |
| CN | 110658584 | 1/2020 |

OTHER PUBLICATIONS

"Written Opinion of the International Searching Authority (Form PCT/ISA/237) of PCT/CN2020/076340", dated Jun. 30, 2020, pp. 1-6.

\* cited by examiner

ULTRA-BROADBAND SILICON WAVEGUIDE MICRO-ELECTRO-MECHANICAL SYSTEMS (MEMS) PHOTONIC SWITCH

CROSS-REFERENCE TO RELATED APPLICATION

This application is a 371 of international application of PCT application serial no. PCT/CN2020/076340, filed on Feb. 24, 2020, which claims the priority benefit of China application no. 201910949968.1, filed on Oct. 8, 2019. The entirety of each of the above mentioned patent applications is hereby incorporated by reference herein and made a part of this specification.

BACKGROUND

Technical Field

The disclosure relates to an ultra-broadband silicon waveguide micro-electro-mechanical systems (MEMS) photonic switch, and in particular to an integrated silicon waveguide MEMS photonic switch that can control the optical transmission direction through adjusting a bias voltage.

Description of Related Art

Due to the rapid growth of data flow, people have higher requirements for the reconfigurability and scalability of data center networks. Extensive research has been conducted on fast electro-optical switches in data center networks. The conventional electrical switches can no longer meet the requirements of high-speed and large-capacity communications, so scientists gradually divert their attention to optical communications. Since the 1990s, optical communications have developed rapidly. The optical interconnection and optical switches as the key technologies for optical communications have naturally become more and more important.

Optical switches are the key element of optical systems and optical networks. In the all-optical network, functions such as routing selection of all-optical layer, wavelength selection, optical add/drop multiplexing, optical cross-connection (OXC), and automatic network protection and monitoring may be implemented. The main performance indicators of the optical switches include switching speed, insertion loss, crosstalk, polarization sensitivity, bandwidth, scalability, reliability, stability, etc. Different fields or systems have different requirements for the optical switch. In order to meet different demands, optical switches based on different switching principles and technologies are widely proposed. There are the mechanical optical switches that adopt an electromagnet or a motor in free space to move an optical element such as an optical fiber, a prism, or a micromirror to implement light path conversion. There are also the waveguide photonic switches that are based on the electro-optical effect, magneto-optical effect, acousto-optical effect, etc. to implement light path conversion. There are also other types of optical switches, such as liquid crystal optical switches and holographic optical switches.

Waveguide photonic switches are easy to integrate, small in size, and have a fast switching speed, which is an important direction for researches on the optical switches. Although there are many types of waveguides materials, one of the most widely used waveguides materials is silicon. Silicon-on-insulator (SOI) is a typical silicon platform, which is configured to manufacture dielectric waveguides, passive waveguide devices, and active waveguide devices. The superiority of silicon waveguide photonic switch is mainly manifested as follows. The silicon photonic switch is compatible with traditional silicon technologies to implement photoelectric integration. The refractive index difference between the waveguide and the cladding is high, which can confine the guided-mode well. The integrated volume of a single device can be small, which is conducive to large-scale integration.

There are electro-optical and thermo-optical silicon photonic switches, and there have been many researches on photonic switches based on the two principles. People have begun to try new methods to design photonic switches, and MEMS technology is one of them. The full English name of MEMS technology is micro-electro-mechanical systems technology. The size of MEMS devices is generally on the order of millimeters or even smaller, and the internal structure thereof is on the order of micro-nano meters. The MEMS photonic switch is a micro photonic switch with considerable research values. The MEMS device designs combine the principles of light, electricity, and machinery, and they generally implement the function of turning on and off the optical circuit through various ways such as electrostatic actuators and magneto-striction. MEMS photonic switches are small in size, low in cost, easy to integrate, manufacturable in batches, and has good repeatability.

SUMMARY

In view of the prior technologies, the objective of the disclosure is to provide an ultra-broadband silicon waveguide micro-electro-mechanical systems (MEMS) photonic switch. A nano-gap with a certain inclination is fully etched in the center of a waveguide crossing. The width of the nano-gap is adjusted through adjusting a voltage applied across both ends of the waveguide crossing to control the light propagation direction, so as to achieve the light path switching.

The specific technical solutions adopted by the disclosure are as follows.

The photonic switch includes a $SiO_2$ layer and two input/output waveguides arranged on the $SiO_2$ layer, a waveguide crossing with a nano-gap. The waveguide crossing with the nano-gap includes a waveguide crossing and a nano-gap. The waveguide crossing is composed of two elliptical cylinders with the same size and shape. The centers of the two elliptical cylinders are overlapped and the long axes are perpendicularly overlapped with each other to form a four-petal shape. The center of the waveguide crossing is etched with the nano-gap. Specifically, the nano-gap is fully etched and disposed between symmetrical concaves on two sides formed by the two overlapped elliptical cylinders. The nano-gap divides the waveguide crossing into two sub-waveguide crossings. Both ends of the long axes of the two elliptical cylinders of the waveguide crossing serve as ports. A total of four ports are formed. The four ports are respectively connected to four single-mode strip waveguides. The two closely adjacent ports are respectively connected to the first input-waveguide and the second input-waveguide, and the other two ports are respectively connected to the first output-waveguide and the second output-waveguide. The first input-waveguide and the second output-waveguide are symmetrically arranged at both ends of the long axis of the first elliptical cylinder of the waveguide crossing. The second input-waveguide and the first output-waveguide are symmetrically arranged at both ends of the long axis of the second elliptical cylinder of the waveguide crossing. An end of the nano-gap extends through a concave edge of the waveguide crossing between the first output-waveguide and the second output-waveguide, and another end of the nano-gap extends through the concave edge of the waveguide crossing between the first input-waveguide and the second input-waveguide. The middle of the second input-waveguide and the first output-waveguide are fully etched to respectively form a first nano-groove and a second nano-groove. The two nano-grooves are arranged perpendicular to the extending directions of their own waveguides. The $SiO_2$ layer around and under the waveguide crossing with the nano-gap is removed to form an air gap. The outward radial direction of the air gap should cover the first nano-groove and the second nano-groove to ensure that the $SiO_2$ layer under the first nano-groove and the second first nano-groove is removed, so that the waveguide crossing with the nano-gap can be bent and deformed within the plane surface of the $SiO_2$ layer. The two sub-waveguide crossings are connected to an external circuit. The width of the nano-gap is adjusted through adjusting the magnitude of a bias voltage applied across the two sub-waveguide crossings, thereby controlling the light propagation direction, so as to implement the switching of the light propagation path.

The $SiO_2$ layer around and under the waveguide crossing with the nano-gap is completely penetrated and removed downward to form the air gap using a corrosive solution.

The nano-gap in the waveguide crossing is fully etched, that is, the etching depth of the nano-gap is the entire height of the elliptical cylinders.

The first nano-groove and the second nano-groove are fully etched, that is, the etching depths of the first nano-groove and the second nano-groove are respectively the entire heights of the first output-waveguide and the second input-waveguide.

The waveguides arranged on the entire photonic switch device adopt the same silicon material with the same thickness.

The $SiO_2$ layer serves as the lower cladding, and the upper cladding is air. The waveguides of the disclosure are located between the upper and lower cladding materials and are etched into strip structures to allow fundamental mode light to be transmitted inside.

All materials involved in the disclosure basically have transparent characteristics in the optical communication band. The material absorption loss of the entire structure only accounts for an extremely small part of the total loss.

A number of the same photonic switches can be connected to constitute a photonic switch array. The photonic switches are evenly distributed. The ports facing adjacent photonic switches are connected together, so that the photonic switches are cascaded. According to the different requirements, the photonic switch array controls the light propagation path through controlling an optical signal to pass through each photonic switch, so as to implement the optical signal transmission of the entire photonic switch array.

In the photonic switch array, the two connected ports of the adjacent photonic switches are located in the same input/output waveguides. The lower claddings of all photonic switches are the same piece of SiO2 layer.

The entire photonic switch structure or the arrayed photonic switch structure may be manufactured by monolithic integration.

In the disclosure, the nano-gap is fully etched in the center position of the waveguide crossing, and the lower cladding of the surrounding region thereof is corroded. The structure has a simple design and is compatible with the complementary metal-oxide semiconductor (CMOS) processes. A bias voltage is applied across the two separated parts of the waveguide crossing. The width of the nano-gap is adjusted through controlling the voltage, so as to switch the light propagation path.

In the disclosure, the propagation path of the photonic switch is switched through adjusting the voltage applied to the waveguide crossing. The structure is simple and may be easily integrated and cascaded. A waveguide photonic switch array with a miniaturization, a low cost, and a fast switching speed is expected to be implemented.

The beneficial effects of the disclosure are as follows.

1. The structure is simple and the design is convenient, which can significantly reduce the manufacturing cost of the device.

2. No other material is introduced except for silicon waveguide, which is compatible with the CMOS processes.

3. The design principle is simple and the switch mechanism adopts the principles of total internal reflection and the material bending and deformation, which are easy to understand.

4. The insertion loss of a single device is rather low; the wavelength sensitivity is also low; the bandwidth is broad; and the manufacturing tolerance is good.

5. A "cross-bar" orthogonal structure is adopted, which is convenient for cascading to form the photonic switch array.

In the figures: 1. $SiO_2$ layer, 2. air gap formed by etching $SiO_2$ layer, 3. the first input-waveguide, 4. waveguide crossing with a nano-gap, 5. nano-gap, 6. the first nano-groove, 7. the first output-waveguide, 8. the second output-waveguide, 9. the second nano-groove, and 10. the second input-waveguide.

DETAILED DESCRIPTION OF DISCLOSED EMBODIMENTS

The disclosure will be further described with references to the figures and embodiments.

Figure 1:
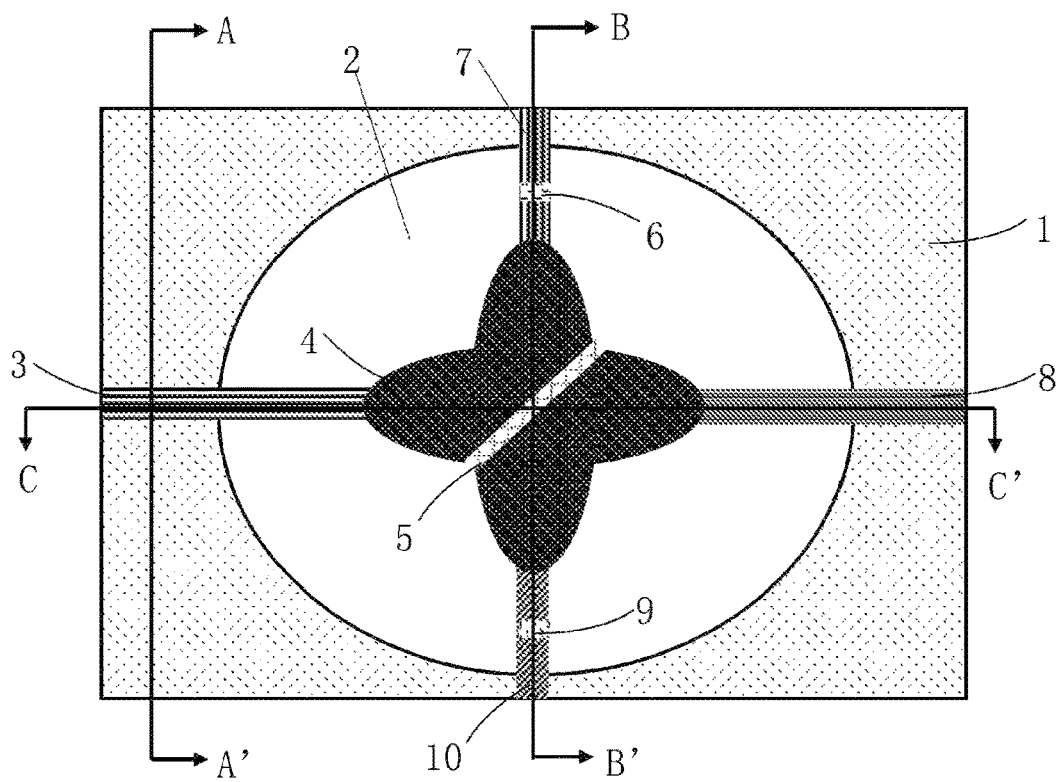
FIG. 1 is a top view of a structure in an initial state according to the disclosure.
Figure 2:
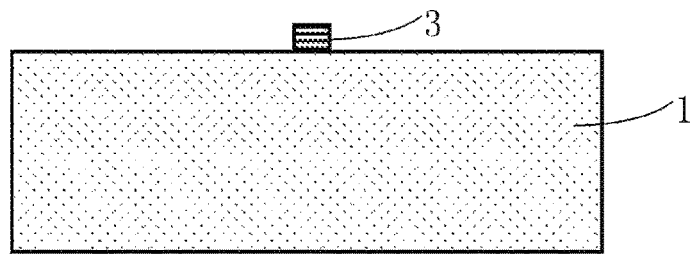
FIG. 2 is cross-sectional view along A-A' of FIG. 1.
Figure 3:
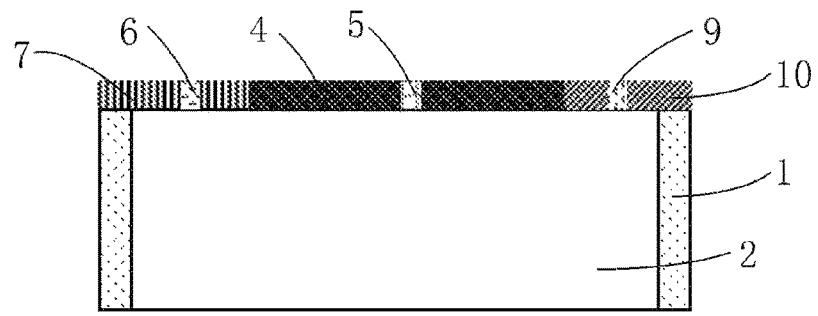
FIG. 3 is cross-sectional view along B-B' of FIG. 1.
Figure 4:
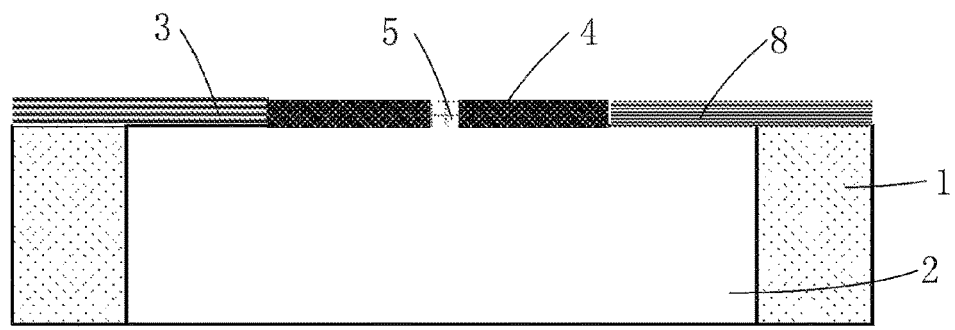
FIG. 4 is cross-sectional view along C-C' of FIG. 1.

As shown in FIG. 1, the specifically implemented photonic switch includes a $SiO_2$ layer 1 and two input waveguides 3 and 10 arranged on the $SiO_2$ layer 1, a waveguide crossing with a nano-gap 4, and two output waveguides 7 and 8. The lower cladding of the entire device is $SiO_2$ layer 1, the upper cladding is air, and the lower cladding near the waveguide crossing is also air.

As shown in FIG. 1 to FIG. 4, the waveguide crossing with the nano-gap 4 includes a waveguide crossing and a nano-gap 5 disposed on the waveguide crossing. The waveguide crossing is composed of two overlapped elliptical cylinders with the same size and shape. The two elliptical cylinders are axially perpendicular to the surface of the SiO$_2$ layer 1. The centers of the two elliptical cylinders are overlapped and the long axes are perpendicularly overlapped with each other to form a four-petal shape. The overlapped region of the two overlapped elliptical cylinders is the waveguide crossing. The center of the waveguide crossing is etched with the nano-gap 5. Specifically, the nano-gap 5 is fully etched and disposed between symmetrical concaves on two sides formed by the two overlapped elliptical cylinders. The nano-gap 5 divides the waveguide crossing with the nano-gap 4 into two sub-waveguide crossings. As shown in FIG. 1, the region where the two elliptical cylinders overlap with each other is fully etched to form the nano-gap 5 which is in the 45° diagonal direction.

The waveguide crossing has four input/output ports. Both ends of the long axes of the two elliptical cylinders of the waveguide crossing serve as ports. A total of four ports are formed. The four ports are respectively connected to four single-mode strip waveguides. The two closely adjacent ports respectively extend to connect to the first input-waveguide 3 and the second input-waveguide 10, and the other two ports respectively extend to connect to the first output-waveguide 7 and the second output-waveguide 8. The first input-waveguide 3 and the second output-waveguide 8 are symmetrically arranged at both ends of the long axis of the first elliptical cylinder of the waveguide crossing. The second input-waveguide 10 and the first output-waveguide 7 are symmetrically arranged at both ends of the long axis of the second elliptical cylinder of the waveguide crossing. Two adjacent strip waveguides of the four single-mode strip waveguides extending from the waveguide crossing 4 serve as the input waveguides, and the remaining two strip waveguides serve as the output waveguides. As such, an end of the nano-gap 5 extends through a concave edge of the waveguide crossing between the first output-waveguide 7 and the second output-waveguide 8, and another end extends through the concave edge of the waveguide crossing between the first input-waveguide 3 and the second input-waveguide 10. The middle of the first output-waveguide 7 and the second input-waveguide 10 perpendicular to the first input-waveguide 3 are respectively fully etched to form a first nano-groove 6 and a second nano-groove 9. The two nano-grooves are arranged perpendicular to the extending directions of their own waveguides. The SiO$_2$ layer 1 around and under the waveguide crossing with the nano-gap 4 is removed to form an air gap 2, so that the waveguide crossing with the nano-gap 4 is only supported by the first input-waveguide 3 and the second output-waveguide 8 on the center of the SiO$_2$ layer 1 at the peripheral edge. The outward radial direction of the air gap 2 should cover the first nano-groove 6 and the second nano-groove 9 to ensure that the SiO$_2$ layer 1 under the first nano-groove 6 and the second nano-groove 9 is removed, so that the waveguide crossing with the nano-gap 4 can be bent and deformed within the plane surface of the SiO$_2$ layer 1. The two sub-waveguide crossings are connected to an external circuit, and a bias voltage is applied across the two sub-waveguide crossings. The width of the nano-gap 5 is adjusted through adjusting the magnitude of the bias voltage applied across the two sub-waveguide crossings, thereby controlling the light propagation direction and switching the light propagation path, so as to implement the switching function.

The entire waveguide structure is on the SiO$_2$ lower cladding. For the structure to deform and displace within the horizontal plane, all SiO$_2$ near the waveguide crossing needs to be corroded. The corrosion range must be more than the nano-grooves on the two input/output waveguides. In specific implementation, the SiO$_2$ layer 1 around and under the waveguide crossing with the nano-gap 4 is completely penetrated and removed downward to form the air gap 2 using a corrosive solution, which is equivalent to etching the middle cylinder of the SiO$_2$ layer 1, so that the air gap 2 is an elliptical cylinder.

The two separated parts of the waveguide crossing are connected to an external circuit. The width of the nano-gap is adjusted through adjusting a voltage applied across both ends of the waveguide crossing.

Figure 7:
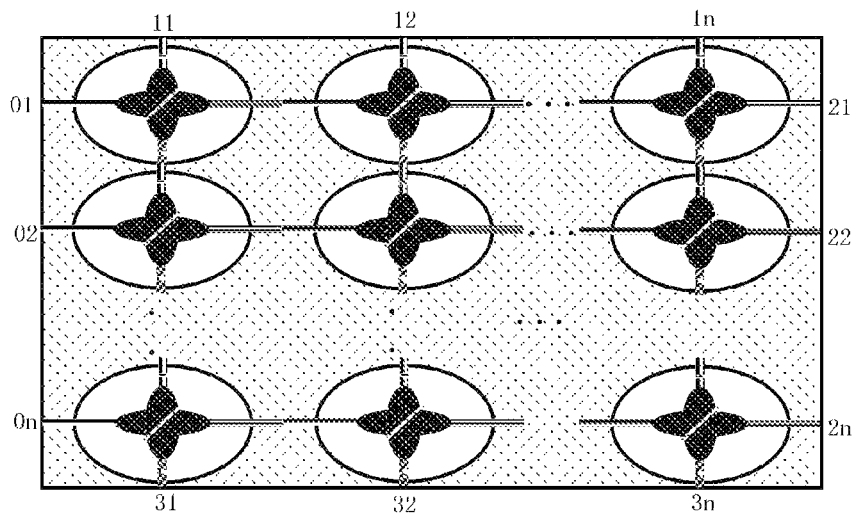
FIG. 7 is a top view of a structure of a photonic switch array formed according to the disclosure.

The structure is cascaded to form an n×n photonic switch array, as shown in FIG. 7. The figure shows an n×n photonic switch matrix, where 01, 02, . . . , 0n and 31, 32, . . . , 3n are all input ports, and 11, 12, . . . , 1n and 21, 22, . . . , 2n are all output ports. Each photonic switch within the array is exactly the same, and it is only required to connect the input or output waveguides into a single-mode straight waveguide. However, the voltage applied to each waveguide crossing is independent, so a single photonic switch structure may be adjusted.

In specific implementation, the input waveguides, the waveguide crossing with the nano-gap, and the output waveguides are all the same material, and may be manufactured by the monolithic integration. Moreover, the "cross-bar" waveguide crossing has four ports, so that the ports are conveniently cascaded to form a monolithic integrated arrayed photonic switch structure.

The working processes of the photonic switch array according to the disclosure is as follows.

According to the principle of total internal reflection: when light is transmitted from an optically dense medium to an optically thin medium, the total reflection occurs when the incident angle is greater than a certain critical value, and the light is no longer incident into the optically thin medium. As shown in FIG. 1, the light is transmitted from the input port into the waveguide crossing. The waveguide crossing is equivalent to an optically dense medium, and the air in the gap is an optically thin medium. Taking silicon as an example, the critical angle of light from the silicon waveguide to the air is about 17°, and the inclination angle of the gap is 45°, which is much greater than the critical angle. Therefore, a strong total reflection occurs when the light reaches the interface between the waveguide and the gap. The incident angle and the reflection angle are both 45°, and the light is output from the output waveguide.

Figure 5:
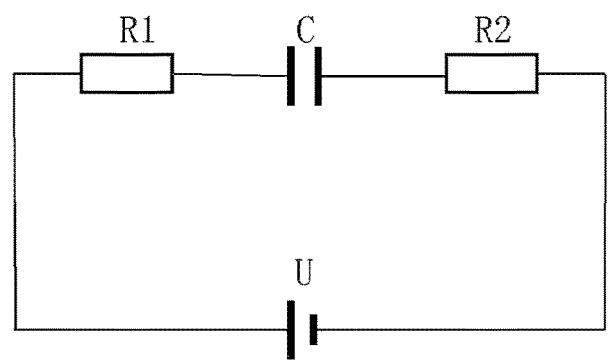
FIG. 5 is an equivalent circuit diagram of the structure after applying a bias voltage.
Figure 6:
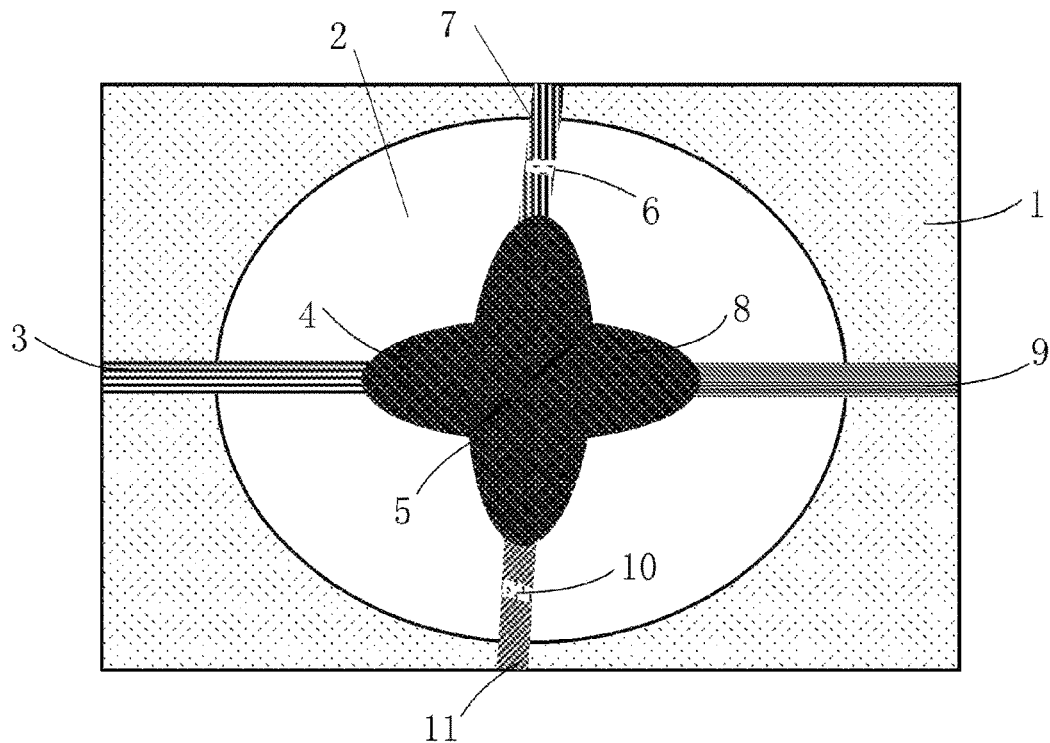
FIG. 6 is a top view of the structure after applying a certain bias voltage.

A bias voltage is applied across the two separate waveguide crossings. The equivalent circuit diagram is shown in FIG. 5. The separated waveguide crossings are equivalent to two resistors, and the nano-gap is equivalent to a capacitor. When a voltage is applied to the circuit, electrostatic forces generated on two sides of the gap make them attract each other. Due to the presence of the nano-grooves on the first output-waveguide and the second input-waveguide and the air gap, the separated waveguide crossings are equivalent to two cantilever beams, which bend and deform under the effect of electrostatic forces within the horizontal plane. The electrostatic forces are generated in the nano-gap. The two parts of waveguide crossing bend toward the direction of the gap. When the voltage is large enough, the two sides of the gap are approximately attached together, as shown in FIG. 6. At this time, the separated waveguide crossings are equivalent to no gap. The mode light is incident from the first input-waveguide and may directly and horizontally pass through the separated waveguide crossings to reach the second output-waveguide.

Such waveguide crossings are formed into an array structure, as shown in FIG. 7. The mode light is input from a certain input port. Through controlling whether to apply a voltage to the separated waveguide crossings passed through, the direct passing through or the total reflection is controlled, thereby controlling the light propagation direction, so that the light is transmitted to the desired output port. For example, if it is intended to control the light to be input from the port 02 and output from the port 1n, a voltage needs to be applied to the photonic switches in the $1^{st}$ to $(n-1)^{th}$ columns of the $2^{nd}$ row, so that the light directly passes through the first (n-1) photonic switches, and the total reflection occurs only at the photonic switch in the $n^{th}$ column of the $2^{nd}$ row, and a voltage is applied to the photonic switch in the $n^{th}$ column of the $1^{st}$ row, so that the light directly passes through to the port 1n.

Specific embodiments of an ultra-broadband silicon waveguide micro-electro-mechanical systems (MEMS) photonic switch are given below.

Taking a single photonic switch as an example, as shown in FIG. 1.

A silicon nanowire waveguides based on silicon-on-insulator (SOI) platform is selected. A core layer thereof is a silicon material with a thickness of 220 nm and a refractive index of 3.4744. A lower cladding material thereof is $SiO_2$ with a thickness of 2 μm and a refractive index of 1.4404. An upper cladding material is air with a refractive index of approximately 1. An incident wavelength range to be considered is from 1.3 μm to 1.6 μm. A TE0 mode is adopted.

The silicon layer is etched into a waveguide crossing with four orthogonal ports by processes such as photolithography. The waveguide crossing adopts two orthogonal elliptical cylinder structures. A long axis radius of a bottom surface of the elliptical cylinder is 7.6 μm and a short axis radius is 1.4 μm. Each port of the waveguide crossing extends and etches four strip-shaped single-mode waveguides. The adjacent waveguides are perpendicular to each other. Taking one of the waveguides as the first input-waveguide. According to a clockwise sequence, the other three waveguides are respectively the first output-waveguide, the second output-waveguide, and the second input-waveguide. A groove with a width of 200 nm is fully etched at an inclination of 45° in the center position of the waveguide crossing. A gap with a width of 100 nm is also etched on the first output-waveguide and the second input-waveguide at a position a certain length away from the waveguide crossing. Finally, the $SiO_2$ lower cladding near the waveguide crossing is corroded using a corrosive solution to form an air gap. The corroded area must exceed the gap position of the two output waveguides, otherwise the waveguide will not achieve the ideal deformation. Finally, the edge of the nano-gap is oxidized to form a thin oxide layer, so that the waveguide crossing is not completely conducted after the voltage is applied and the gap is closed.

Figure 8:
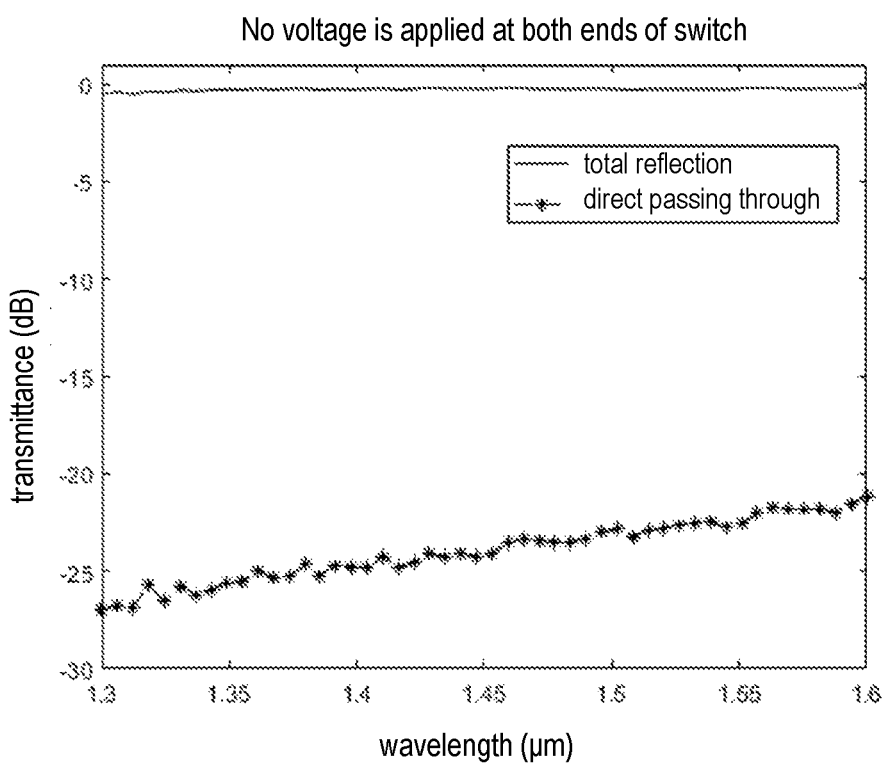
FIG. 8 is a transmission spectrum of two output ports when no voltage is applied across both ends of a switch.

The initial waveguide crossing is divided into two parts. The TE0 mode light propagates from the first input-waveguide to the waveguide crossing. When light propagates to the gap, due to the high refractive index of silicon and the low refractive index of air, the total reflection occurs at the interface between the waveguide and the air, and the incident light is output from the first output-waveguide. Within the range of 1.3 μm to 1.6 μm, the transmission spectrum of the two ports of the structure is as shown in FIG. 8. The average total reflection loss is -0.35 dB and the direct passing through loss is below -20 dB, which may ensure that most of the light energy can be output from the total reflection port when no voltage is applied.

Figure 9:
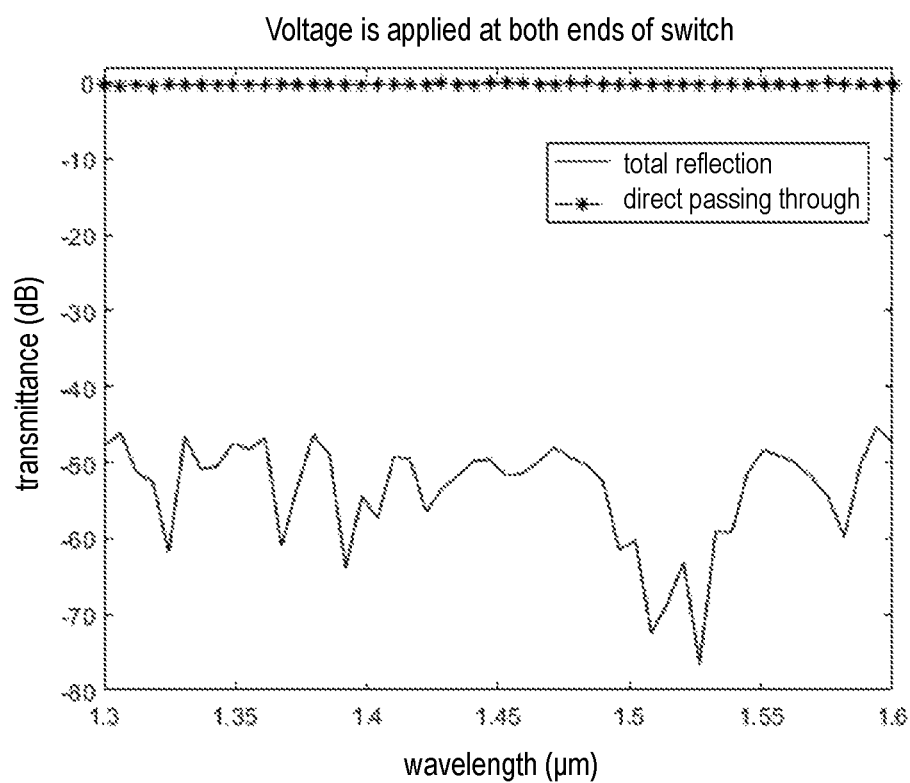
FIG. 9 is a transmission spectrum of the two output ports when both ends are closed after a voltage is applied across both ends of the switch.

A bias voltage is applied across the two separated parts of the waveguide. A space between two end surfaces of the etched gap is equivalent to a capacitor. An electrostatic force is generated between the two separated parts to attract each other. The two parts of the waveguide are both deformed. Deformations and displacements are generated within the horizontal plane. When the voltage value reaches about 20 V, the two separated end surfaces are approximately attached together. After the TE0 mode light is input from the first input-waveguide, the light energy directly passes through and propagates to the second output-waveguide. At this time, the transmission spectrum of the two ports of the structure are as shown in FIG. 9. The average direct passing through loss is -0.3 dB and the total reflection loss is below -45 dB, that is, when the two ports are closely attached together, the input light is output from the direct passing through port. In the two states, the light loss is relatively low. For light in the wavelength range from 1.3 μm to 1.6 μm, the 1 dB bandwidth reaches hundreds of nanometers and the structural tolerance is relatively good.

The above embodiments are used to explain the disclosure, but not to limit the disclosure. Any modification or change made to the disclosure within the spirit of the disclosure and the protection scope of the claims falls within the protection scope of the disclosure.

What is claimed is:

1. An ultra-broadband silicon waveguide micro-electro-mechanical systems (MEMS) photonic switch, wherein the photonic switch comprises three parts: a $SiO_2$ layer and two input waveguides arranged on the $SiO_2$ layer, a waveguide crossing with a nano-gap, and two output waveguides;

the waveguide crossing with the nano-gap comprises a waveguide crossing and a nano-gap disposed on the waveguide crossing, the waveguide crossing is composed of two overlapped elliptical cylinders with the same size and shape, and centers of the two elliptical cylinders are overlapped and long axes are perpendicularly overlapped with each other to form a four-petal shape;

a center of the waveguide crossing is etched with the nano-gap, specifically, the nano-gap is fully etched and disposed between symmetrical concaves on two sides formed by the two overlapped elliptical cylinders, and the nano-gap divides the waveguide crossing into two sub-waveguide crossings;

both ends of the long axes of the two elliptical cylinders of the waveguide crossing serve as ports, a total of four ports are formed, the four ports are respectively connected to four single-mode strip waveguides, the two adjacent ports are respectively connected to the first input-waveguide and the second input-waveguide, and the other two ports are respectively connected to the first output-waveguide and the second output-waveguide, the first input-waveguide and the second output-waveguide are symmetrically arranged at both ends of a long axis of the first elliptical cylinder of the waveguide crossing, and the second input-waveguide and the first output-waveguide are symmetrically arranged at both ends of a long axis of the second elliptical cylinder of the waveguide crossing;

an end of the nano-gap extends through a concave edge of the waveguide crossing between the first output-waveguide and the second output-waveguide, and another end of the nano-gap extends through the concave edge of the waveguide crossing between the first input-waveguide and the second input-waveguide;

a middle of the second input-waveguide and the first output-waveguide are fully etched to respectively form a first nano-groove and a second nano-groove, and the two nano-grooves are arranged perpendicular to extending directions of own waveguides;

the $SiO_2$ layer around and under the waveguide crossing with the nano-gap is removed to form an air gap, an outward radial direction of the air gap covers the first nano-groove and the second nano-groove to ensure that the $SiO_2$ layer under the first nano-groove and the second nano-groove is removed, so that the waveguide crossing with the nano-gap is bent and deformed within a plane surface of the $SiO_2$ layer;

the two sub-waveguide crossings are connected to an external circuit, and a width of the nano-gap is adjusted through adjusting a magnitude of a bias voltage applied across the two sub-waveguide crossings, thereby controlling a light propagation direction, so as to implement switching of a light propagation path.

2. The ultra-broadband silicon waveguide MEMS photonic switch according to claim 1, wherein the $SiO_2$ layer around and under the waveguide crossing with the nano-gap is completely penetrated and removed downward to form the air gap using a corrosive solution.

3. The ultra-broadband silicon waveguide MEMS photonic switch according to claim 1, wherein the nano-gap in the waveguide crossing is fully etched, that is, an etching depth of the nano-gap is an entire height of the elliptical cylinder.

4. The ultra-broadband silicon waveguide MEMS photonic switch according to claim 1, wherein the first nano-groove and the second nano-groove are fully etched, that is, etching depths of the first nano-groove and the second nano-groove are respectively entire heights of the first output-waveguide and the second input-waveguide.

5. The ultra-broadband silicon waveguide MEMS photonic switch according to claim 1, wherein all waveguides arranged on the entire photonic switch device adopt the same silicon material with the same thickness.

6. The ultra-broadband silicon waveguide MEMS photonic switch according to claim 1, wherein the $SiO_2$ layer serves as a lower cladding, and an upper cladding is air.

7. The ultra-broadband silicon waveguide MEMS photonic switch according to claim 1, further comprising a plurality of photonic switches to constitute a photonic switch array, wherein a plurality of photonic switch arrays are evenly distributed, ports facing adjacent photonic switches are connected together, so that the photonic switches are cascaded, according to requirements of input and output, the photonic switch array controls the light propagation path through controlling an optical signal to pass through each photonic switch, so as to implement optical signal transmission of the entire photonic switch array.

8. The ultra-broadband silicon waveguide MEMS photonic switch according to claim 7, wherein in the photonic switch array, two connected ports of the adjacent photonic switches are located and formed in the same waveguide, and the lower claddings of all photonic switches are the same piece of $SiO_2$ layer.

* * * * *